United States Patent [19]

Caza

[11] Patent Number: 5,562,590

[45] Date of Patent: Oct. 8, 1996

[54] PROCESS FOR ENCAPSULATING A WASTE MATERIAL

[75] Inventor: Stanley G. Caza, Bootle, England

[73] Assignee: British Technology Group Limited, London, England

[21] Appl. No.: 387,780

[22] PCT Filed: Aug. 18, 1993

[86] PCT No.: PCT/GB93/01757

§ 371 Date: Apr. 5, 1995

§ 102(e) Date: Apr. 5, 1995

[87] PCT Pub. No.: WO94/04290

PCT Pub. Date: Mar. 3, 1994

[30] Foreign Application Priority Data

Aug. 19, 1992 [GB] United Kingdom ............... 9217594

[51] Int. Cl.⁶ .................. B01D 15/00; A62D 3/00
[52] U.S. Cl. .................. 588/257; 210/751; 405/128; 588/252; 588/256; 588/900
[58] Field of Search .................. 210/751; 405/128; 588/249, 252, 256, 257, 900

[56] References Cited

U.S. PATENT DOCUMENTS

| | | | |
|---|---|---|---|
| 3,929,586 | 12/1975 | Slikkers, Jr. ................... | 210/751 X |
| 4,038,184 | 7/1977 | Svanteson ...................... | 210/751 |
| 4,463,691 | 8/1984 | Meenan et al. ................. | 588/900 X |
| 4,514,307 | 4/1985 | Chestnut et al. ............... | 210/751 |
| 4,606,283 | 8/1986 | DesOrmeaux et al. .......... | 588/900 X |
| 4,828,761 | 5/1989 | Mattus et al. .................. | 252/628 |
| 4,931,192 | 6/1990 | Covington et al. ............. | 210/751 |
| 5,037,560 | 8/1991 | Gayman ......................... | 210/751 |
| 5,051,031 | 9/1991 | Schumacher et al. .......... | 405/128 X |
| 5,277,826 | 1/1994 | Burns et al. ................... | 210/751 |
| 5,490,907 | 2/1996 | Weinwurm et al. ............ | 210/751 X |

FOREIGN PATENT DOCUMENTS

| | | |
|---|---|---|
| 0408545A1 | 1/1991 | European Pat. Off. . |
| 0417705A1 | 3/1991 | European Pat. Off. . |
| 2518525 | 6/1983 | France . |
| 2591513 | 6/1987 | France . |
| 3006483A1 | 9/1981 | Germany . |
| 209639 | 1/1924 | United Kingdom . |
| 2096390 | 10/1982 | United Kingdom . |
| 2161106 | 1/1986 | United Kingdom . |
| 2254322 | 10/1992 | United Kingdom . |

OTHER PUBLICATIONS

Database WPI, Section CH, Week 8818, Derwent Publications Ltd. London, GB; Class A81, AN 88–123203 & JP A,63 067 595 (Mitsubishi Metal) 26 Mar. 1988. Abstract.

Database WPI, Section CH, Week 9124, Derwent Publications Ltd., London GB; Class E16 AN 91–175132 & JP A 3 106 854 (Daiichi Kogyo Seiyaku) 7 May 1991. Abstract.

Database WPI, Section CH, Week 8745, Derwent Publications Ltd., London GB; Class A93 AN 87–319484 & SU A, 1 293 144 (UKR–Cellulose–Paper) 28 Feb. 1987. Abstract.

Patent Abstracts of Japan, vol. 9 No. 192(C–296) 8 Aug. 1985 & JP A,60 061 (Kikushi Kagaku) 8 Apr. 1985. Abstract.

Database WPI, Section CH, Week 8910, Derwent Publications Ltd., London GB; Class E17, AN 89–075961 & SU A, 1 421 722 (Urals Nonfer Metal) 7 Sep. 1988. Abstract.

Database WPI, Section CH, Week 8747, Derwent Publications Ltd., London GB; Class K07, AN 87–329881 & JP A,62 233 799 (Toshiba et al) 14 Oct. 1987. Abstract.

*Primary Examiner*—George A. Suchfield
*Attorney, Agent, or Firm*—Nixon & Vanderhye

[57] ABSTRACT

Sludges and slurries, e.g., oil, grease or paint based, are encapsulated into fly ash or similar particulate material by adding solvents to effect the encapsulation and absorption of the sludge. Subsequently, the particulate material is heated to remove the solvent, leaving a dry powder which may then be used as a filler for various applications, including production of breeze blocks.

17 Claims, 1 Drawing Sheet

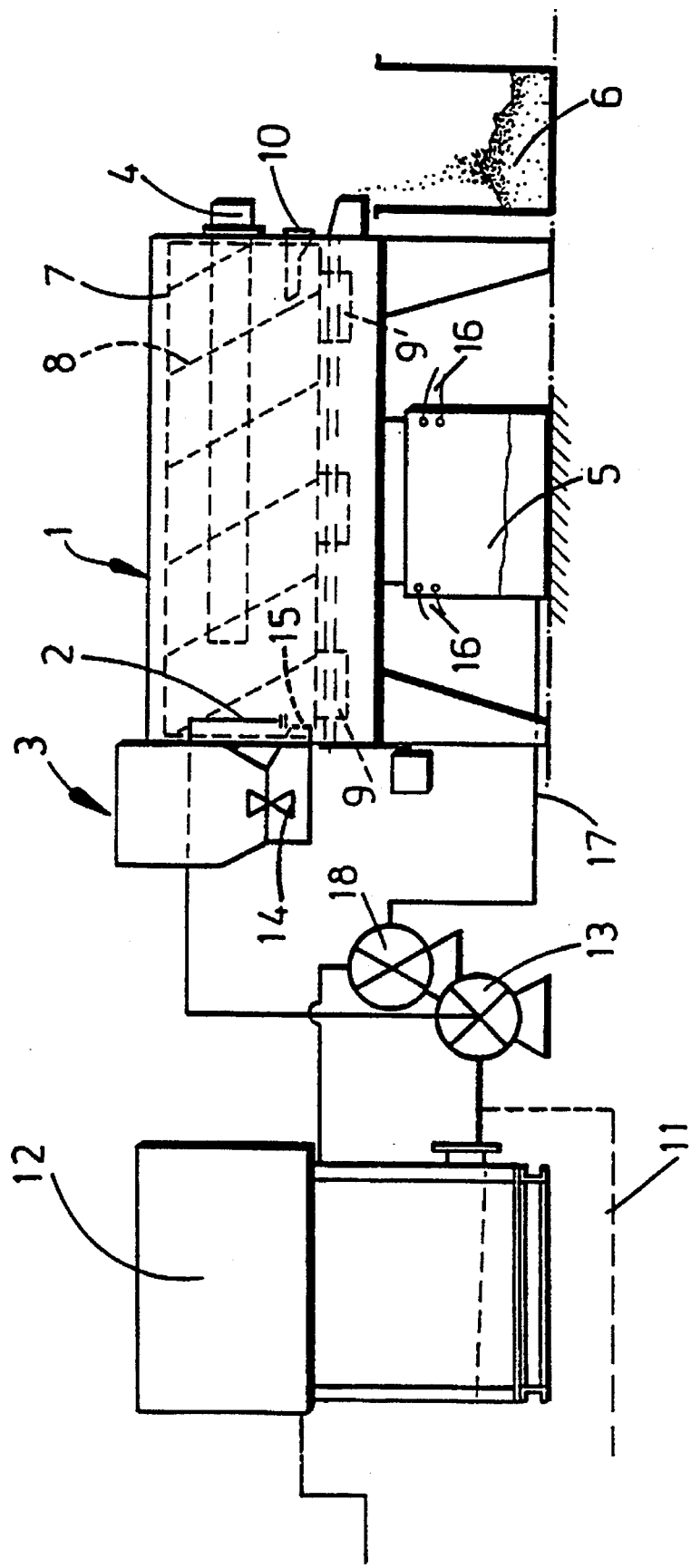

PROCESS FOR ENCAPSULATING A WASTE MATERIAL

BACKGROUND OF THE INVENTION

This invention relates to a process and apparatus for encapsulating of waste material, for example an oleopholic waste material.

Examples of waste materials with which the invention is concerned include such materials present in a sludge. Sludges are generated in various industrial processes. For example, the cleaning of metal parts to remove grease may involve soaking the part in an organic solvent with the result that the grease removed (i.e. the waste material) forms a sludge with the organic solvent. Sludges may also be produced, for example, from dye, ink, and paint industries in which paint, ink or dye is dissolved in an organic solvent. The organic solvents may, be chlorinated solvents, e.g. trichloroethylene, perchloroethylene etc., or aromatic solvents, e.g. toluene. The sludges generally have no value.

Examples of other waste materials with which the invention is concerned include oil, tar or the like provided for example in the form of: oil (or tar) contaminated sand.

Problems can be encountered in the disposal of the above types of waste material to ensure that they do not adversely affect the environment.

SUMMARY OF THE INVENTION

It is an object of the present invention to obviate or mitigate the above mentioned problems.

According to a first aspect of the present invention there is provided a process of the encapsulation of a waste material comprising providing the waste material in association with a vaporizable liquid, admixing the waste material/liquid composition with an absorbent particulate material, and heating the admixture to remove the solvent.

According to a second aspect of the invention there is provided apparatus for encapsulating waste material comprising a mixer, means for supplying a composition of the waste material and a vaporizable liquid to the mixer, and heating means for heating the content of the mixer to remove said liquid.

The preferred particulate material for use in the invention is Fly Ash (available as a waste-product from coal-burning power stations) although other absorbent particulate materials may be used e.g. Kieselguhr or lime.

Preferably, the particulate material has a particle size of 10–40 microns. An example of such a material is so called mechanical Fly Ash.

Ideally the waste material is substantially completely disolved in the vapourizable liquid which will generally be an organic solvent.

The organic solvent may, for example, be an aliphatic or aromatic solvent. The solvent may be a chlorinated solvent, e.g. a perchlorinated solvent. Examples of solvents include trichloroethylene, perchloroethylene, acetone and toluene.

The presence of the vapourizable liquid (preferably an organic solvent) in the sludge is an important feature of the invention. We have found that the liquid allows the waste material to be transported into the particulate material but that subsequent removal of the liquid by vapourization allows the waste material to remain firmly bound within the particulate material. Thus, the waste material will not "leach" out of the particulate material which may therefore simply be disposed of, for example in a landfill site. However, the particulate material may be put to more beneficial use, for example as a filler in construction materials, e.g. tarmac. A particularly beneficial use of the material is in the manufacture of breeze blocks. Thus, the present invention enables two (normally) waste materials (e.g. Fly Ash and waste material being treated) to be converted into a product which has commercial value.

Waste material to be treated by the method of the invention will generally, but not necessarily, be oleophilic materials and may be relatively viscous materials (e.g. oils greases etc.). The waste material may come from a variety of sources, examples of which are given below.

In one embodiment of the invention, the waste material may be in the form of a sludge or slurry which may or may not incorporate a relatively minor proportion of an organic solvent.

Generally, sludges to be treated in the method of the invention will be waste from a process in which the waste material (e.g. tar, oil, grease, ink, dye or paint) is dissolved, disposed or otherwise formulated with an organic solvent. It is however also possible for the present invention to be applied to the treatment of aqueous based sludges. Such aqueous based sludges will be obtained, for example, in the digestion of grease by caustic soda. To treat the aqueous sludge, water is initially removed (e.g. using membrane technology) and an organic solvent may be added to "dissolve" the grease.

Irrespective of the type of sludge, it will generally be admixed with an excess by volume of the vaporizable liquid under conditions which promote substantially complete disolution of the waste material and ensure that there are no agglommerates or lumps of sludge. Typically the volume of vaporizing liquid used will be up to 10 times that of the sludge although it will be appreciated that use of excessive amounts of solvents involves unnecessary expense, not least because of heating costs for vaporizing the solvent. Usually the volume of vapourisable liquid will be 1 to 5 times that of the sludge.

In a further embodiment, the invention may be applied to the treatment of oil or tar contaminated sand. In this case, the contaminated sand may be treated with the vaporizable liquid to break down the agglomerated structure and form a dispersion of the sand particles in the solvent in which the tar or oil may be dissolved. Sufficient vaporizable liquid may be used to give a dispersion in the form of a slurry. Typically, the contaminated sand is mixed with vaporizable liquid in a volume ratio of solvent to sand of up to 10:1, more preferably 1:1 to 5:1. After admixture with the absorbent particulate material (e.g. Fly Ash) and removal of the liquid the resulting product is an admixture of the sand and the particulate material in which the tar or oil is encapsulated.

It will be appreciated from the foregoing description that the invention is applicable to the encapsulation of a wide variety of waste materials. The fundamental step is the treatment of the waste material to be encapsulated with a vaporizable liquid (generally using a volume ratio of up to 10:1, e.g. 1:1 to 5:1) which 'transports' the waste material into the particulate material in which waste material is encapsulated after vaporization of solvent.

Preferably the volume ratio of particulate material: (waste material and vaporizable liquid) which are mixed together is greater than 1:1 and may for example be up to 10:1. Typically the ratio will be in the range 3:1 to 6:1.

The mixing of the waste material/liquid composition and the particulate material is preferably effected in a rotary mixer comprising a cylindrical drum with a helix formed on its inner surface. The drum may be rotated about its longitudinal axis in one direction to mix the contents thereof, and rotated in the other direction to pass the contents for discharge from one end of the drum. The heating of the mixture may conveniently be effected by a hot air circulation heater positioned proximate the drum axis.

Typically mixing will be effected for 30 minutes to 2 hours. The temperature to which the mixture is heated will depend on the boiling point of the liquid but will typically be in the range 40° to 90° C. For example, use of trichloroethylene as the liquid will require a temperature of 80°–87° C. whereas for acetone the temperature will be 40°–50°.

BRIEF DESCRIPTION OF THE DRAWING

A specific embodiment of the present invention will now be described by way of example only with reference to the accompanying drawings, in which:

FIG. 1 is a schematic view of an apparatus according to the present invention.

DETAILED DESCRIPTION OF A PREFERRED EMBODIMENT

As shown in the drawing, there is illustrated a sludge treatment apparatus comprising a rotary mixer 1 having in inlet 2, a particulate material hopper 3, a heater 4, a solvent collection tank 5, and a container 6 for the final product.

The mixer 1 has a rotatable cylindrical drum provided on its inner surface with a helix 8. The outer surface of drum 7 rests on rollers 9 by means of which the drum may be rotated. One end of the drum 7 is closed, at which end the inlet 2 and particulate material hopper 3 are situated. A scraper blade 10 is provided adjacent the other, open end of the drum 7 to scrape material from the drum sides. The heater 4 extends within the drum close to the longitudinal axis thereof.

Sludge to be treated will be passed along a line 11 into which is introduced solvent from a solvent distillation unit 12. The mixture is fed by a diaphragm pump 13 to the inlet 2 so as to be introduced into drum 7 in which mixing is effected to dissolve the sludge.

The particulate material hopper 3 will (in use of the apparatus) be charged with, for example, mechanical Fly Ash. Within the hopper 3 is a regulator valve 14 though which the particulate material is fed to hopper outlet 15 (located proximate sludge inlet 2). Fly Ash from hopper 3 is introduced into drum 7 once the sludge has dissolved.

During operation of the process (described more fully below) solvent will be evaporated and collected in the solvent collection tank 5 (in which condensation is assisted by coils 16). Solvent may be returned along a line 17 (via a pump 18) to the distillation plant 12 for purifying the solvent. Purified solvent from plant 12 may be fed into sludge line 11 to "dilute" the incoming sludge.

During operation of the process the drum 7 is rotated by the rollers 9. This rotation of the drum is carried out in a direction which permits the helix to effect mixing without conveying the contents out of the open end of the drum.

The relative proportion of Fly Ash, waste material and solvent are selected so as to ensure complete encapsulation of the waste. The relative amounts required may be determined by laboratory scale experiments. Generally the final mix will have the consistency of a wet slurry.

In the next stage, the heater 4 is operated to increase the temperature within the drum to a level at which the solvent is evaporated from the particulate material. Obviously, the particular temperature required within the drum will depend on the solvent which was present in the original sludge. Solvent expelled from the particulate material is collected in tank 5 for recycling to distillation plant 19 as described previously.

When all solvent has been evaporated, the rotational direction of drum 7 is reversed so that the treated particulate material is fed along the drum and collected in the receptacle 6. During this operation, scraper blade 10 serves to remove material adhering to the inside of the drum.

The collected powder may be used as a filler for building materials.

EXAMPLES

The invention is illustrated by the following non-limiting examples.

Example 1

A tar/sand mixture obtained from tar ponds in Canada was mixed with acetone in a volume ratio of acetone:sand of 2:1. Mixing was effected with heating so as to dissolve the tar in the acetone. The resulting composition was admixed with 4 parts by volume of mechanical Fly Ash using the apparatus illustrated in the drawing and heated at 40°–50° C. for 1 hour.

The product was a dry powder (admixture of sand and Fly Ash containing encapsulated tar) which could be used as a building material (e.g. in the manufacture of breeze blocks or finished cement material).

The leachability of the tar from the Fly Ash was tested and found to be acceptable under Canadian Government Standards.

Example 2

A paint sludge containing about 2% of organic solvent was mixed with trichloroethylene (TCE) in a volume ratio of TCE:sludge of 2:1. Mixing was effected until the paint was in solution.

The resulting composition was mixed with 4 parts by volume of mechanical Fly Ash and the mixture heated at 80° C. to 87° C. to remove solvent.

The product was a dry powder. Leachability was found to be acceptable for present landfill legislation in the U.K.

This Example could also be repeated with ink-, dye-, grease- or oil-based sludges.

Example 3

An aqueous based sludge which contained lubricants and protective greases and which was produced by the cleaning of car bodies was obtained from a car assembly plant. The sludge was substantially dewatered using membrane separation to give a waste material (i.e. lubricant and grease) containing about 10% water.

Two parts by volume of trichloroethylene were thoroughly mixed with 1 part of volume of the waste material until the lubricants and greases had dissolved. Four parts by volume of mechanical Fly Ash were then added and mixing effected in the apparatus shown in the drawing and the mixture was heated at 80° C. to 87° C. to vaporize the solvent.

The product was a dry powder which was acceptable for landfill purposes, the powder being non-leaching to U.K. Standards.

I claim:

1. A process for the encapsulation of an oleophilic waste material, said process comprising:

providing the waste material in association with an organic vaporizable liquid;

admixing the waste material/liquid composition with an absorbent particulate material of particle size 10–40 microns selected from the group consisting of fly ash and kieselguhr; and heating the admixture to remove the organic vaporizable liquid.

2. A process as claimed in claim 1 wherein the particulate material is mechanical Fly Ash.

3. A process as claimed in claim 1, wherein the oleophilic material is substantially completely dissolved in the vapourisable liquid.

4. A process as claimed in claim 1 wherein the ratio by volume of the vapourisable liquid to the waste material is less than 10:1.

5. A process as claimed in claim 4 wherein said ratio is 1:1 to 5:1.

6. A process as claimed in claim 1, wherein the vapourisable liquid is an organic solvent.

7. A process as claimed in claim 6, wherein the solvent is an aliphatic or aromatic solvent.

8. A process as claimed in claim 6, wherein the solvent is a chlorinated solvent.

9. A process as claimed in claim 8, wherein the solvent is trichloroethylene or perchloroethylene.

10. A process as claimed in claim 6 wherein the solvent is acetone or toluene.

11. A process as claimed in claim 1 wherein the volume ratio of particulate material: waste material and solvent is greater than 1:1.

12. A process as claimed in claim 11 wherein said ratio is up to 10:1.

13. A process as claimed in claim 12 wherein said ratio is 3:1 to 6:1.

14. A process as claimed in claim 1 wherein the admixing of the waste material, liquid and the particulate material is effected in a rotary cylindrical drum having an axis an formed with a helix on its inner surface.

15. A process as claimed in claim 14 wherein the heating of the mixture to remove solvent is effected by a hot air circulation heater positioned proximate the drum axis.

16. Apparatus for encapsulating waste material comprising:

a rotary mixer comprising a rotatable cylinder drum having an axis and a helix formed on an inner surface of said drum;

means for supplying a composition of the waste material and a vaporizable liquid to the mixer;

means for supplying an absorbent particulate material to the mixer; and heating means for heating the content of the mixer to remove said liquid.

17. An apparatus as claimed in claim 16 wherein the heating means comprises a hot air circulation heater positioned proximate the drum axis.

* * * * *